(12) United States Patent
Northrup et al.

(10) Patent No.: US 10,963,686 B2
(45) Date of Patent: Mar. 30, 2021

(54) SEMANTIC NORMALIZATION IN DOCUMENT DIGITIZATION

(71) Applicant: INTERNATIONAL BUSINESS MACHINES CORPORATION, Armonk, NY (US)

(72) Inventors: Kevin Northrup, North York (CA); Craig M. Trim, Sylmar, CA (US); Terry Hickey, Toronto (CA); Abisola Adeniran, Halifax (CA); Kenji Northrup, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 525 days.

(21) Appl. No.: 15/829,078

(22) Filed: Dec. 1, 2017

(65) Prior Publication Data

US 2019/0171872 A1 Jun. 6, 2019

(51) Int. Cl.
*G06F 16/00* (2019.01)
*G06K 9/00* (2006.01)
(Continued)

(52) U.S. Cl.
CPC ....... *G06K 9/00456* (2013.01); *G06F 16/284* (2019.01); *G06F 16/35* (2019.01);
(Continued)

(58) Field of Classification Search
CPC .. G06K 9/00456; G06K 9/6298; G06K 9/726; G06F 40/30; G06F 40/109;
(Continued)

(56) References Cited

U.S. PATENT DOCUMENTS 9,659,084 B1 5/2017 Zhang
9,876,848 B1 * 1/2018 Carroll ............... G06K 9/00536
(Continued)

FOREIGN PATENT DOCUMENTS

CN 102422286 A 4/2012
CN 105787056 A 7/2016

OTHER PUBLICATIONS

Google Search (Year: 2008).*
(Continued)

*Primary Examiner* — Mark D Featherstone
*Assistant Examiner* — Kweku William Halm
(74) *Attorney, Agent, or Firm* — James Nock, Esq.; George S. Blasiak, Esq.; Heslin Rothenberg Farley & Mesiti P.C.

(57) ABSTRACT

Methods, computer program products, and systems are presented. The methods include, for instance: identifying a candidate key corresponding to an object in a document image with a key in key ontology data, based on that the candidate key is semantically interchangeable with the key. A context, position, and style of each objects of the document image is represented in the document metadata. The candidate key is normalized into a normal form. A key class corresponding to the normal form is determined and a confidence score indicating a likelihood of the key class being representative of the candidate key is assessed. A semantic database is updated with the key class upon verification for enhanced processing of future documents.

25 Claims, 8 Drawing Sheets

(51) Int. Cl.
*G06F 40/30* (2020.01)
*G06F 40/109* (2020.01)
*G06F 16/28* (2019.01)
*G06F 16/35* (2019.01)
*G06N 20/00* (2019.01)
*G06K 9/62* (2006.01)

(52) U.S. Cl.
CPC ............ *G06F 40/109* (2020.01); *G06F 40/30* (2020.01); *G06K 9/6298* (2013.01); *G06N 20/00* (2019.01)

(58) Field of Classification Search
CPC ........ G06F 16/284; G06F 16/35; G06F 16/93; G06N 20/00; G06N 5/022
See application file for complete search history.

(56) References Cited

U.S. PATENT DOCUMENTS

| | | | |
|---|---|---|---|
| 10,438,083 B1* | 10/2019 | Rivard | G06K 9/3258 |
| 2009/0106234 A1 | 4/2009 | Siedlecki et al. | |
| 2009/0164428 A1 | 6/2009 | Green et al. | |
| 2009/0245657 A1* | 10/2009 | Osugi | G06K 9/00791 |
| | | | 382/209 |
| 2010/0036789 A1 | 2/2010 | Marleau | |
| 2010/0042914 A1* | 2/2010 | Horiuchi | G06F 40/14 |
| | | | 715/235 |
| 2011/0010555 A1* | 1/2011 | Moskowitz | G06F 21/10 |
| | | | 713/176 |
| 2011/0153653 A1* | 6/2011 | King | G06F 16/5846 |
| | | | 707/769 |
| 2011/0289026 A1 | 11/2011 | Kannan et al. | |
| 2012/0179684 A1 | 7/2012 | Alba et al. | |
| 2015/0066895 A1* | 3/2015 | Komissarchik | G06F 16/2322 |
| | | | 707/709 |
| 2016/0070768 A1 | 3/2016 | DeRose | |
| 2016/0085852 A1 | 3/2016 | Deshpande et al. | |
| 2018/0359518 A1* | 12/2018 | Deshpande | H04N 21/64322 |

OTHER PUBLICATIONS

Song et al., "On concise set of relative candidate keys", Proceedings of the VLDB Endowment, vol. 7, Issue 12, pp. 1179-1190 (Year: 2014).*

Written Opinion and International Search Report, International Application No. PCT/IB2018/059490, filed Nov. 30, 2018, dated Mar. 13, 2019.

Mell, Peter, et al., "The NIST Definition of Cloud Computing", NIST Special Publication 800-145, Sep. 2011, Gaithersburg, MD, 7 pgs.

* cited by examiner

300

303

| 301 ORGANIZATION NAME AND LOGO | | | 302 CONTACT INFORMATION | |
|---|---|---|---|---|

TAX INVOICE

| 310K SOLD TO: | 310V _NAME & ADDRESS_ | 320K | INVOICE # | 320V _INVN_ |
| | | 330K | ORDER # | 330V _ODN_ |
| 340K DATE | 340V _MM/DD/YY_ | | 304 PRP CODE | |

305 ITEMS LIST

Payment Details

| 350K BANK | 350V _B_CODE_ | |
|---|---|---|
| 360K ACCOUNT NAME | 360V _A_NAME_ | 306 INVOICE SUMMARY |
| 370K ACCOUNT | 370V 573093486 | |

```
L501:   {
L502:   "FromBlockID": "block_16",
L503:   "Value": "573093486",
L504:   "ValueStartX": 628,
L505:   "ValueStartY": 6916,
L506:   "KeyStartX": 300,
L507:   "KeyStartY": 6917,
L508:   "Key": "Acct No"
L509:   }
        ...
L511:   {
L512:   "FromBlockID": "block_16",
L513:   "Value": "573093486",
L514:   "ValueStartX": 628,
L515:   "ValueStartY": 6916,
L516:   "KeyStartX": 300,
L517:   "KeyStartY": 6917,
L518:   "Key": "Acct No",
L519:   "Key Class Confidence": 82.35,
L520:   "Key Class": "customerAccountNumber"
L521:   }
```

FIG. 5

SEMANTIC NORMALIZATION IN DOCUMENT DIGITIZATION

TECHNICAL FIELD

The present disclosure relates to document digitization technology, and more particularly to methods, computer program products, and systems for semantically normalizing keys appearing in document images.

BACKGROUND

In conventional document processing, ink-on-paper documents are scanned page by page as respective visual images in preparation. A resulting document file of scanned papers is typically a series of visual image of pages. Each visual image of a page has objects representing words, phrases, sentences, and values of numerous formats corresponding to a certain words. A series of processes recognizing data contents of such visual objects and relating a certain data contents together to make computational data as in data field names and corresponding values of relational databases is referred to as a document digitization, or data extraction. Computational data may be accessed and further processed by use of numerous computer program applications. In light of the amount of information represented in legacy paper forms and scanned documents images not yet computational, automatic and accurate data extraction from legacy documents may contribute significantly to industrial and societal productivity.

SUMMARY

The shortcomings of the prior art are overcome, and additional advantages are provided, through the provision, in one aspect, of a method. The method for normalizing a key in a document image includes, for instance: obtaining, by one or more processor of a computer, document metadata of the document image, where the document metadata include a context, a position, and a style respective to each object appearing in the document image; identifying a candidate key corresponding to an object in the document image with a key in key ontology data, based on that the candidate key is semantically interchangeable with the key; normalizing the candidate key into a normal form; determining a key class corresponding to the normal form, wherein the key class is associated with the key in the key ontology data; assessing a confidence score for the key class, wherein the confidence score indicates a likelihood of the key class being representative of the candidate key, based on the document metadata; and updating a semantic database with the key class, based on verifying the key class according to a preconfigured manner of verification, such that the key class may be efficiently associated with a semantically interchangeable text appearing in other document images.

The shortcomings of the prior art are overcome, and additional advantages are provided, through the provision, in one aspect, of a method. The method for normalizing a key in a document image includes, for instance: identifying, by one or more processor of a computer, a candidate key corresponding to an object in the document image with a key in key ontology data, based on that the candidate key is semantically interchangeable with the key; normalizing the candidate key into a normal form; deriving one or more alias of the candidate key from the normal form, wherein the one or more alias is not associated with the key in a semantic database; assessing respective confidence score for each of the one or more alias, where the confidence score indicates a likelihood of each alias being representative of the candidate key, based on document metadata of the document image; and updating the semantic database with the one or more alias, based on verifying the one or more alias according to a preconfigured manner of verification, such that the one or more alias may be efficiently associated with a text from other document images, based on that the text semantically matches with the candidate key.

The shortcomings of the prior art are overcome, and additional advantages are provided, through the provision, in one aspect, of a computer program product. The computer program product includes, for example: a computer readable storage medium readable by one or more processor and storing instructions for execution by the one or more processor for performing a method for normalizing a key in a document image including: obtaining document metadata of the document image, where the document metadata include a context, a position, and a style respective to each object appearing in the document image; identifying a candidate key corresponding to an object in the document image with a key in key ontology data, based on that the candidate key is semantically interchangeable with the key; normalizing the candidate key into a normal form; determining a key class corresponding to the normal form, wherein the key class is associated with the key in the key ontology data; assessing a confidence score for the key class, wherein the confidence score indicates a likelihood of the key class being representative of the candidate key, based on the document metadata; and updating a semantic database with the key class, based on verifying the key class according to a preconfigured manner of verification, such that the key class may be efficiently associated with a semantically interchangeable text appearing in other document images.

The shortcomings of the prior art are overcome, and additional advantages are provided, through the provision, in one aspect, of a computer program product. The computer program product includes, for instance: a computer readable storage medium readable by one or more processor and storing instructions for execution by the one or more processor for performing a method for normalizing a key in a document image including: identifying a candidate key corresponding to an object in the document image with a key in key ontology data, based on that the candidate key is semantically interchangeable with the key; normalizing the candidate key into a normal form; deriving one or more alias of the candidate key from the normal form, wherein the one or more alias is not associated with the key in a semantic database; assessing respective confidence score for each of the one or more alias, wherein the confidence score indicates a likelihood of each alias being representative of the candidate key, based on document metadata of the document image; and updating the semantic database with the one or more alias, based on verifying the one or more alias according to a preconfigured manner of verification, such that the one or more alias may be efficiently associated with a text from other document images, based on that the text semantically matches with the candidate key.

The shortcomings of the prior art are overcome, and additional advantages are provided, through the provision, in one aspect, of a system. The system includes, for example: a memory; one or more processor in communication with memory; and program instructions executable by the one or more processor via the memory to perform a method for normalizing a key in a document image includes: obtaining document metadata of the document image, wherein the document metadata include a context, a position, and a style respective to each object appearing in the document image; identifying a candidate key corresponding to an object in the document image with a key in key ontology data, based on that the candidate key is semantically interchangeable with the key; normalizing the candidate key into a normal form; determining a key class corresponding to the normal form, wherein the key class is associated with the key in the key ontology data; assessing a confidence score for the key class, wherein the confidence score indicates a likelihood of the key class being representative of the candidate key, based on the document metadata; and updating a semantic database with the key class, based on verifying the key class according to a preconfigured manner of verification, such that the key class may be efficiently associated with a semantically interchangeable text appearing in other document images.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 depicts an exemplary document image having objects subject to semantic normalization, as performed by the semantic normalization engine, in accordance with one or more embodiments set forth herein;

FIG. 5 depicts an exemplary input and output of the semantic normalization engine, in accordance with one or more embodiments set forth herein;

DETAILED DESCRIPTION

Figure 1:
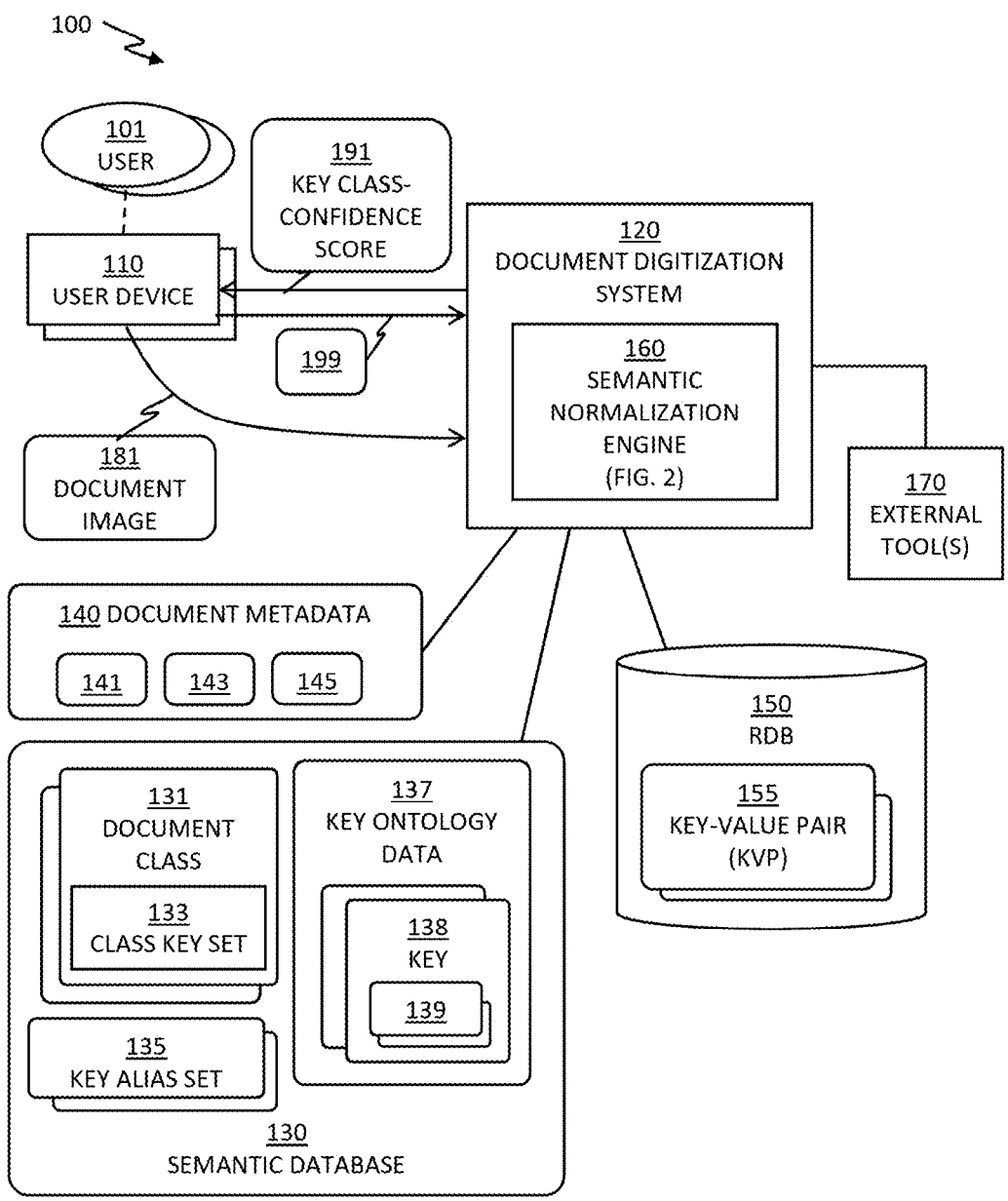
FIG. 1 depicts a system for semantically normalizing contents during document digitization, in accordance with one or more embodiments set forth herein.

FIG. 1 depicts a system 100 for semantically normalizing contents during document digitization, in accordance with one or more embodiments set forth herein.

Digital documents are often preferred for the convenience in computationally using data represented in the documents. When pen-on-paper documents are scanned in, the documents are a series of visual image of pages, but not computationally ready for usage as digital data. At the beginning of the document processing, the document images are unstructured collection of objects. The texts, numbers, symbols, and combinations thereof shown in the objects are extracted as respective data. Certain texts and data may be associated in order to form a key-value pair in a relational database such that information in the document images may be computational.

Because the time and cost required for manually digitizing images of legacy documents would be prohibitive, and because manual digitization may be inaccurate and inconsistent due to a human error factor and individual interpretation of words in a document, it is desirable to automate the process of digitizing document images with accuracy, for further utilization of data represented in the document images. For example, data from a scanned invoice may be an input to a relational database management system, for being searched against and/or compared with content from other documents from databases, websites, etc.

However, with existing document processing applications, numerous custom formats and distinctive organizations of documents, even for documents for a same purpose, present challenges in processing the document images and extracting computational data out of the document. Particularly, semantically exchangeable but yet distinctive wordings for a data field in documents would be recognized as respective data fields without a certain normalization during a document digitization. For example, most invoices have an invoice number identifying an invoice, an account number identifying a customer who receives the invoice, and an order number identifying a transaction subject to the invoice. In one company, the invoice may be worded as "Invoice No.", "Account No.", and "Order No.", and another company may express the same data fields with "Inv_Num", "Accnt_Num", and "Purchase_Id". Certain embodiments of the present invention normalize various semantically interchangeable wordings from many document sources as a normalized data field name as described herein, in order to accurately digitize data associated with such various semantically interchangeable wordings across various formats of documents, such that the data would be effectively represented in a database. In this specification, the normalized data field name is referred to as a key, or a key class.

The system 100 includes a document digitization engine 120. The document digitization engine 120 receives a document image 181 from a user 101 via a user device 110. The document image 181 is a visual image of a document as being optically scanned, but content of the document image 181 is not computational. For example, a scanned image of a paper document may not be searched or be read into another application as data input, because the document image 181 does not have any computational data. The document image 181 has numerous objects corresponding to respective words, which may be extracted as computational data.

The document digitization engine 120 includes a semantic normalization engine 160. The document digitization engine 120 processes the document image 181 and determines document metadata 140, which specifies each object in the document image 181 by use of preconfigured parameters for each object. An example of object hierarchy within the document image 181 is presented in FIG. 4. The parameters of the document metadata 140 may be, but are not limited to, object context 141, position coordinates 143, and object styles 145. The document digitization engine 120 generates one or more key-value pair (KVP) 155 in a relational database (RDB) 150, by use of a key and a value corresponding to the key, as represented in the document metadata 140. The document digitization engine 120 reports, to the user 101, a key class-confidence score tuple 191 resulting from a semantic normalization as performed by the semantic normalization engine 160. The user 101 may optionally provide a feedback 199 on the key class-confidence score tuple 191, indicating whether or not the semantic database 130 is to be updated with the key class-confidence score tuple 191.

The document digitization engine 120 is coupled to one or more external tool 170 and a semantic database 130. Examples of the external tool 170 may include, but are not limited to, Optical Character Recognition (OCR) applications for capturing document metadata 140, linguistic processes such as a word classifier and dictionaries for establishing the semantic database 130, and a machine learning tool for training and improving accuracies of the semantic database 130. The semantic database 130 includes one or more document class 131, one or more key alias set 135, and key ontology data 137.

Certain semantically similar variations of keys 138 in the key ontology data 137 are stored in the one or more key alias set 135, respective to a key. In storing aliases in the key alias set 135, the document digitization engine 120 examines the level of semantic similarity between the key and an alias, and discards the alias that does not have a semantic similarity with the key less than a level configured as a threshold similarity.

The key ontology data 137 is trained with a supervised learning as semantic matches are discovered during the process of the document digitization engine 160, by use of the external tool 170 operating a supervised machine learning tool. Even though the semantic similarity is not apparent between the key and the alias, the alias may still be associated with the key in the key alias set 135, based on programmer inputs. Accordingly, semantic matches may be discovered across languages in order to support a wide basis for known aliases.

In the semantic database 130, a document class of the one or more document class 131 includes a class key set 133, which specifies a set of keys that is requested for any document of the document class 131. The class key set 133 is uniquely defined by the user 101 in order to consistently represent the keys and corresponding KVPs in the RDB 150 throughout an application suite, such that the KVPs are usable without further conversion amongst individual applications.

For example, when a document is of a purchase invoice class, a corresponding class key set may include, but are not limited to, a name, a transaction date, an item list, item prices, tax, and a total amount.

In the semantic database 130, each of the one or more key alias set 135 includes aliases corresponding to a key. As noted above, the key is a normalized data field name to be used in the RDB 150, and all aliases in one key alias set 135 are semantically interchangeable with the key. Each alias is unique across all documents, and may correspond to the class key set 133, via the document class for the key 138 as represented in the key ontology data 137.

The semantic database 130 includes key ontology data 137, which defines a set of constraints and meanings modeling a domain of knowledge represented by the document image 181. The key ontology data 137 includes respective attributes 139 for a plurality of keys that may be present in the document image 181. Examples of the attributes 139 may include, but are not limited to, a document class associated with the key 138, a key class to which the key 138 belongs, and a data type and a format for values of the key 138.

The semantic normalization engine 160 automatically grammartizes data field names appearing in the document image 181, by use of parameters such as relative context, relative styling, and relative positioning of the data field names in relation to other objects in the document image 181, as stored in the document metadata 140 and the semantic database 130. The semantic normalization engine 160 also utilizes various existing techniques such as text matching, document classification, and vector space modeling, in order to increase the likelihood of correctly capture various data field names as a corresponding normalized key. Detailed operations of the semantic normalization engine 160 are described in FIG. 2.

Figure 2:
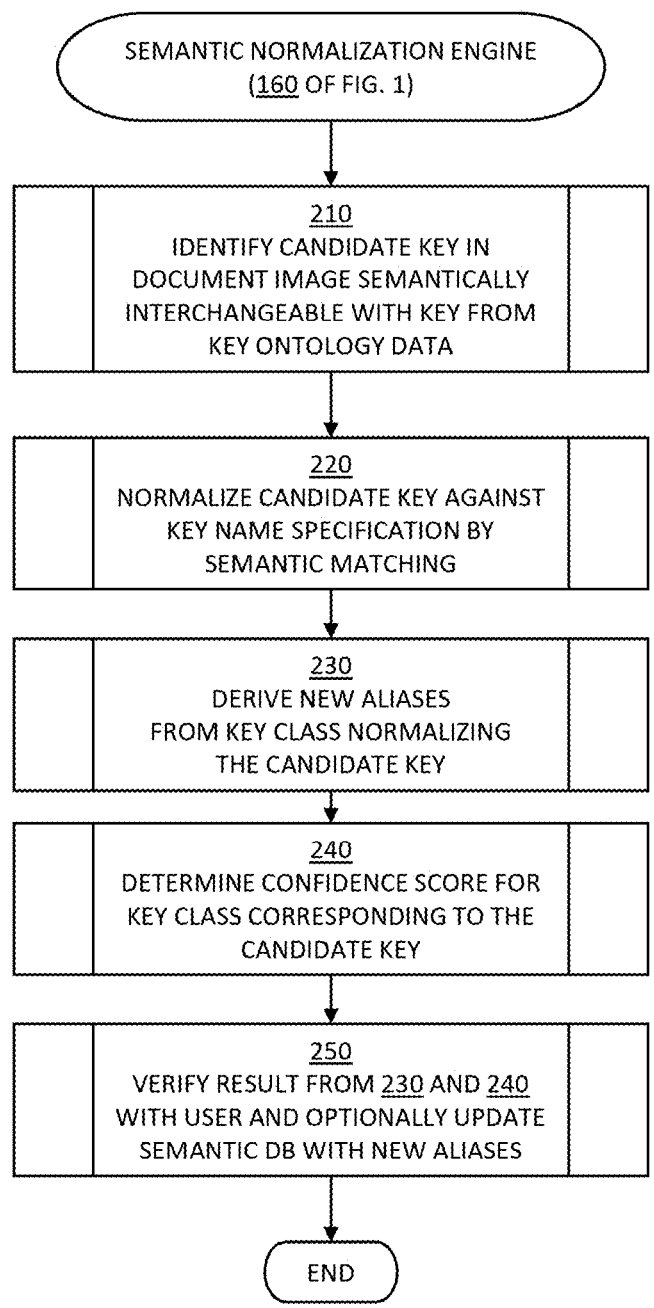
FIG. 2 depicts a flowchart of operations performed by the semantic normalization engine, in accordance with one or more embodiments set forth herein.

FIG. 2 depicts a flowchart of operations performed by the semantic normalization engine 160 of FIG. 1, in accordance with one or more embodiments set forth herein.

Prior to block 210, the document digitization engine 120 has the document class 131 and the key ontology data 137 of the semantic database 130 prepared, either based on key-value pair specification for the RDB as provided by the user 101 or by use of machine learning based on previously processed document images. The document digitization engine 120 classifies the document image 181 based on extracting data from the document image 181 and determines a type of document for the document image 181. The document digitization engine 120 invokes the semantic normalization engine 160 when a candidate key from the document image 181 is not discovered from the semantic database 130. If the document digitization engine 120 discovers an exact text of the candidate key in one of the class key set 133, the key alias set 135, or the key ontology data 137, the document digitization engine 120 may not invoke the semantic normalization engine 160 because the candidate key has already been established in the semantic database 130.

In block 210, the semantic normalization engine 160 identifies a candidate key, in the document image 181 input to the document digitization engine 120, as being semantically interchangeable with a key from the key ontology data 137. The semantic normalization engine 160 may identify more than one candidate key for keys discovered in the class key set 133 for the document class 131 of the document image 181. Then the semantic normalization engine 160 proceeds with block 220.

In this specification, when a key is identified, it is implied that a value corresponding to the key is also identified, such that the key would be reflected as a key-value pair in the RDB 150. In one embodiment of the present invention, the semantic normalization engine 160 examines the document metadata 140 and selects the key aliases and associated values from the document image 181 based on relative positions, relative style specifying color, font type and size of a text, which assimilates a known key from either the semantic database 130 or the RDB 150. The semantic normalization engine 160 may match key texts semantically, values associated with keys for a known data type as specified in the key ontology data 137 as well.

The semantic match function determines whether or not two input texts are semantically interchangeable, as utilized by the semantic normalization engine 160. The semantic match function is proprietary to the document digitization engine 120, of which details are not presented in this specification.

In block 220, the semantic normalization engine 160 normalizes the candidate key identified in block 210 against a key name specification by semantic matching, and determines a key class corresponding to the candidate key. In certain embodiments of the present invention, the key name specification may be, for example, provided by the user 101, prepared by the document digitization engine 120 based on placement of the candidate key in the document image 181, existing aliases from the semantic database 130, or combination thereof according to configuration of the document digitization engine 120. Then the semantic normalization engine 160 proceeds with block 230.

In one embodiment of the present invention, the semantic normalization engine 160 determines whether or not the candidate key matches the key 138 in the key ontology data 137, or an alias corresponding to the key 138 in the key alias set 135. If the semantic normalization engine 160 does not find an exact match of the candidate key from the key/aliases from the semantic database 130, then the semantic normalization engine 160 proceeds with ascertaining if the key/aliases matches the candidate key semantically. The candidate key that is a semantic match of the key/aliases may or may not be added to the key alias set 135, depending on a confidence score, as determined from block 240, and/or a user feedback, as determined from block 250.

In one embodiment of the present invention, the grammar is represented in an extended Backus-Naur form (EBNF) as below, for example, for an Invoice Number key-value pair:

```
letter = "A" | "B" | "C" | "D" | "E" | "F" | "G"| "H" | "I" | "J" | "K" | "L" | "M"
| "N"| "O" | "P" | "Q" | "R" | "S" | "T" | "U" | "V" | "W" | "X" | "Y" | "Z" | "a" |
"b"| "c" | "d" | "e" | "f" | "g" | "h" | "i"| "j" | "k" | "l" | "m" | "n" | "o" | "p"| "q" |
"r" | "s" | "t" | "u" | "v" | "w" | "x" | "y" | "z";
digit = "0" | "1" | "2" | "3" | "4" | "5" | "6" | "7" | "8" | "9";
...
invoiceNumber = "Inv", ("." | "oice" | "_" | ...), ...;
value(invoiceNumber) = "5", 9*digit;
...
```

In block 230, the semantic normalization engine 160 learns all aliases represented by the normal form and/or the key class, as determined from block 220. In one embodiment of the present invention, the semantic normalization engine 160 determines whether or not an alias of candidate key as derived from the normal form and/or the key class is present in the key alias set 135 corresponding to the key 138 specified in the key ontology data 137. Then the semantic normalization engine 160 proceeds with block 240.

In block 240, the semantic normalization engine 160 determines a confidence score for the key class identified for the candidate key, and/or aliases derived from the normal form of block 220, based on comparing various properties of the key specification, as specified in the semantic database 130 and/or the framework of the RDB 150, and the candidate key. Properties are represented in contents of the semantic database 130 and the document metadata 140, respectively associated with the candidate key. Then the semantic normalization engine 160 proceeds with block 250.

In one embodiment of the present invention, the semantic normalization engine 160 ascertains a proximity between the candidate key and a key alias, the key class, and/or a key defined from the key ontology data by comparing character sequences of the candidate key and the key class. For example, if the semantic normalization engine 160 observes: that a key/key class "Account Number" is defined in the key ontology data 137; that the candidate key "ACNT #" appears in the document image; and that an alias "acnt. no." in the key alias set of the key class "Account Number", then the semantic normalization engine 160 may increase the confidence score on the candidate key "ACNT #" being an alias of "Account Number" key, based on that "A", "C", "N", and "T" in the alias appeared in the same order of "Account" in the key 138.

The semantic normalization engine 160 may also utilize relative positioning, context, and styles of the key and a new alias in the document image, in order ascertain similarity between the key and the new alias. For example, if the semantic normalization engine 160 observes that a key "Account Number" is defined in the key ontology data 137 as appearing in a lower left corner of a document page with an Account Name data field, in a boldface font, and an alias "ACCNT NO" appears in lower left corner of a page from the document image 181 with "Customer Name", then the semantic normalization engine 160 may increase the confidence score on "ACCNT NO" being an alias of "Account Number" key.

In the same embodiment, the semantic normalization engine 160 may invoke machine learning process to classify respective texts of the key alias and the key, in order to determine whether or not the texts are directed to a same class. Further in the same embodiment of the present invention, the semantic normalization engine 160 may run processes for vector space modeling and topic modeling to identify a topic of the document image, which may affirm or denounce the classification of the document image. The semantic normalization engine 160 may use existing vector space modeling and topic modeling toolkits such as Gensim implemented in Python programming language.

In block 250, the semantic normalization engine 160 verifies the key class and the aliases derived from the normal form/key class of block 230 and the associated confidence score determined in block 240 by reporting the same, referred to as the key class-confidence score tuple 191, to the user 101 for the feedback 199. The semantic normalization engine 160 may update the semantic database 130 with the new aliases represented in the key class-confidence score tuple 191, according to the feedback 199, where provided by the user 101. In cases where the user 101 does not provide the feedback 199, the semantic normalization engine 160 may still update the semantic database 130 with the contents from the key class-confidence score tuple 191, based on whether or not the confidence score satisfies a preconfigured threshold. Then the semantic normalization engine 160 terminates processing the candidate key identified from block 220. Then semantic normalization engine 160 may iterate blocks 220 through 250 for all candidate keys identified from the document image 181.

In certain embodiment of the present invention, the semantic normalization engine 160 may have a presentation protocol configuring how to present certain aliases of a certain confidence score range, where the presentation protocol directs to represent: an alias that semantically matches to the key in a green box on the document image; another alias that semantically matches to a threshold portion or more of the key in an orange box on the document image; and still another alias that does not match to the key in a red box on the document image, upon discovering that the alias semantically matches to less than the threshold portion of the key. The user 101 may input the threshold portion to determine a semantic match, for example, a half, that is 50%, of the key.

In certain embodiments of the present invention, the semantic normalization engine 160 may have another presentation protocol indicating how many keys in the class key set have been found from the document image, by using the aliases derived from the normal form, as well as preexisting keys in the key alias set 135 and the keys in the key ontology data 137. The semantic normalization engine 160 may mark a boundary of the document as well as each key/alias with a green box, if all keys in the class key set 133 are present in the document image 181. The semantic normalization engine 160 may mark boundaries of words/the document image with respective orange boxes, if certain keys in the class key set 133 are present in the document image 181 only by semantic matches and the confidence score of the aliases are less than perfect (100%). The semantic normalization engine 160 may mark boundaries of words/the document image with respective red boxes, if certain keys in the class key set 133 are missing.

FIG. 3 depicts an exemplary document image 300 having objects subject to semantic normalization, as performed by the semantic normalization engine 160 of FIG. 1, in accordance with one or more embodiments set forth herein.

The exemplary document image 300 depicts a tax invoice issued by an organization. The document digitization engine 120 processes the document image 300 and extracts data from the various objects of the document image as described herein. It is to be understood: that the objects with solid boundaries respectively represent a key of a key-value pair (KVP) as specified by the user 101, by, for example, configuring the RDB 150, or specifying the keys in the key ontology data 137; that the objects with dot-dashed boundaries on the right side of a key respectively represent a value of the KVP; and that the objects with dashed boundaries respectively represent one or more key-value pair.

The document image 300 has, in the upper left corner, a first area 301 representing the name of the organization and a logo. The document image 300 has, in the upper right corner, a second area 302 representing contact information of the organization, such as an address, a telephone number, a website Uniform Resource Locator (URL), and an email address, associated with the organization. The document image 300 also has, in the upper right corner below the second area 302, a third area 303 representing a title of the document identifying the type of the document, which is "TAX INVOICE". According to the document class of invoice/tax invoice predefined in the semantic database 130, a tax invoice document class has a class key set, which specifies keys required for any document of the tax invoice document class.

The document image 300 has "SOLD TO" object 310K and "NAME & ADDRESS_" object 310V side by side. The description enclosed with underscores indicates a space holder for the corresponding data type, which has not been presented for brevity. The document digitization engine 120 associates the objects 310K and 310V, as a key and a value of a data field, based on various parameters applicable for deciding a key-value pair (KVP) from adjacent objects in a document image. Similarly, the document digitization engine 120 determines: "INVOICE #" object 320K as a key, with a corresponding value represented in "_INVN_" object 320V; "ORDER #" object 330K as a key, with a corresponding value represented in "_ODN_" object 330V; and "DATE" object 340K as a key, with a corresponding value represented in "_MM/DD/YY_" object 340V.

The document image 300 has a fourth area 304 "PRP CODE" representing a proprietary code key and a value of the proprietary code. The document image 300 has a fifth area "ITEMS LIST" 305 describing a list of items subject to the tax invoice of the document image 300. The list of items may be represented in a table format, where each item in the list is described with a respective attributes of, for example, an item code, an item description, quantity, price, price adjustment, Goods & Services Tax (GST), and an item total. The document image 300 has a sixth area "INVOICE SUMMARY" 306 representing various details summarizing the tax invoice such as, for example, a subtotal resulting from a sum of prices for items in the item list, a GST subtotal, and a total amount due.

The document image 300 has an area marked with "Payment Details" on the bottom left corner of the image. In the "Payment Details", "BANK" object 350K and "_B_CODE_" object 350K as a key-value pair for a bank information. Similarly, the document digitization engine 120 determines: "ACCOUNT NAME" object 360K as a key, with a corresponding value represented in "_A_NAME_" object 360V, describing an account name data field; and "ACCOUNT" object 370K as a key, with a corresponding value represented in "573093486" object 370V, describing an account number data field, according to a data type of the value as attributed in the key ontology data 137.

The document digitization engine 120 processes the document image 300 and creates component field of the document metadata 140. For example, the document digitization engine 120 discovers that both Invoice number (320K, 320V) and Order number (330K, 330V) appear in similar block isolation with relative positioning within the document image 300. The respective positions, vertically above center line and horizontally on the right side, are recorded in the document metadata 140 as the position coordinates 143 of respective objects. Similarly, the object context 141, position coordinates 143, and object styles 145 associated with each objects respectively represented in the document metadata 140, as generated by the document digitization engine 120 and as inputs to the semantic normalization engine 160. A few components of the document metadata 140 are shown in FIG. 4.

In certain embodiments of the present invention, if the semantic normalization engine 160 obtains a new document image instance of a document class, the semantic normalization engine 160 may develop a grammar for a document class, representing all class keys according to the document metadata, including: the context of how certain KVPs/objects are appearing in certain spacing; certain relative positions in a document image for each object; and a certain style corresponding to each object. The document class grammar may be represented in an EBNF-like notation. The document class grammar may be learned and trained, by use of supervised machine learning, as the semantic normalization engine 160 cumulatively processes document images. If the semantic normalization engine 160 obtains a new document image instance of a document class having a document class grammar, then the semantic normalization engine 160 may add the document metadata, including the object context, relative positioning, and styles of the objects, to training data for the document class grammar.

As the semantic normalization engine 160 processes more invoices, certain elements of the document class grammar may be reinforced as supported by actual invoices. Certain elements of the document class grammar may be discarded when evidences contrary to the document class grammar are more than a threshold number. For example, the document class grammar may set forth that an invoice number data field appears in the context of other data fields including order number, purchase date, and amount due, near the top of a document image, with a 10% larger font than other texts. The document class grammar may also set forth that a total data field appears in the context of a shipping and handling, a tax, and a purchase price, near the bottom right corner of the document image, in a boldfaced dollar amount.

Figure 4:
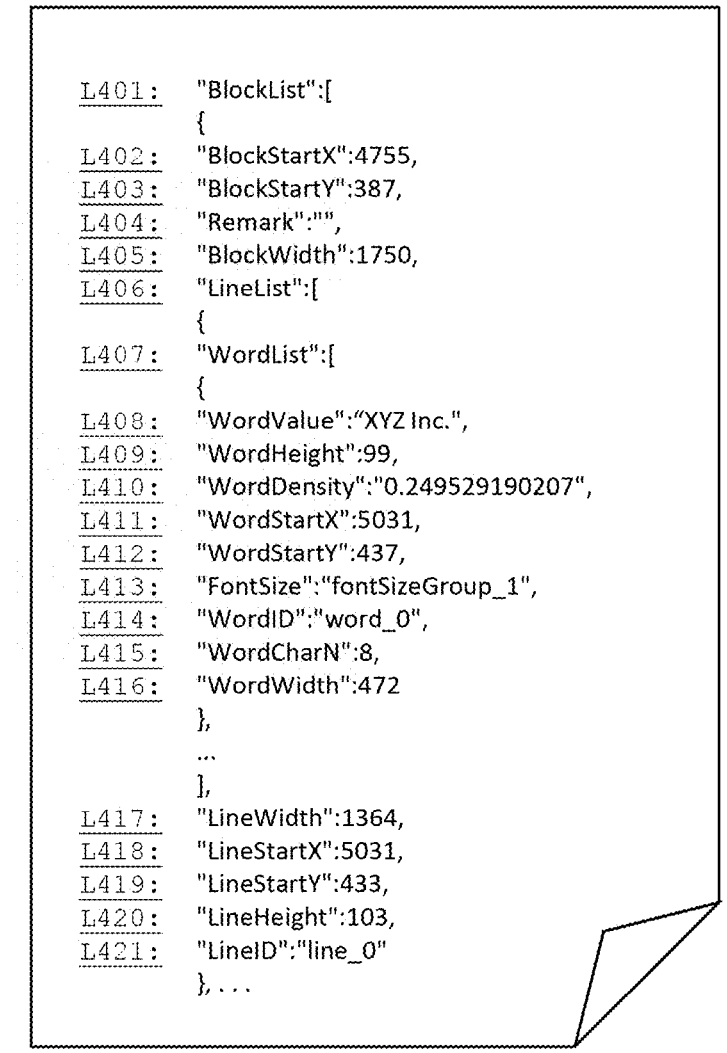
FIG. 4 depicts an exemplary document metadata corresponding to the document image, in accordance with one or more embodiments set forth herein.

FIG. 4 depicts an exemplary document metadata 400 corresponding to the document image 181, in accordance with one or more embodiments set forth herein.

The document digitization engine 120 processes the document image 181 and generates the document metadata 140. In certain embodiments of the present invention, the document digitization engine 120 generates the document metadata 140 in JavaScript Object Notation (JSON) format, as shown in the exemplary document metadata 400. The document image 181 is hierarchically organized as one or more block, which includes one or more line. Each line has one or more word. Each block, line, and word may be deemed as respective object within the document image 181, of which properties are respectively described in the document metadata 140.

Lines L401 indicates that the list describes a block represented by "BlockList". Lines L402 and L403 represent (x,y) coordinates of a starting point of the block. Line L403 indicates no remark is attached to the block. Line L403 indicates that the block is of a certain width. Line L406 indicates that the block has a line represented by "LineList".

Line L407 indicates that the line "LineList" has a word represented by "WordList". Line L408 indicates that the word has a value "XYZ Inc.", lines L409 and L410 respectively indicate height and density of the word. Lines L411 and L412 represent (x,y) coordinates of a starting point of the word. Line L413 indicates a font size of the word, as in a certain custom font size group. Line L414 indicates that the word would be identified by a "word_0" name. Line L415 indicates that the word has eight (8) characters, and line L426 indicates that the word is of a certain width. Measurement may be in pixel units, or according to any other custom units.

Lines L417 through 421 concludes the line "LineList" introduced in L406. A width of the line in L417, (x,y) coordinates of a starting point of the line in lines L418 and L419, a height of the line in Line L420, and a name "line_0" to identify of the line in line L421.

The context of an object is represented by how each object appears in a certain list together. Relative positioning and sizes of the objects may be determined based on various coordinates and dimensional elements such as height and width. The document metadata 140 is used as an input to the semantic normalization engine 160, particularly in order to assess a confidence score on a likelihood of a candidate key being an alias to a known key.

FIG. 5 depicts an exemplary input and output 500 of the semantic normalization engine 160, in accordance with one or more embodiments set forth herein.

As in FIG. 4, the exemplary input and output 500 is expressed in JSON notation. It is to be noted that lines L501 through L509 are an input for a candidate key from the document image 181, and that lines L511 through L521 are an output after the semantic normalization engine 160 processes the candidate key from the input above.

Line L502 indicates that the candidate key is a member of a block identified by "block_16" name. As noted in FIG. 4 above, "block_16" is specified in the document metadata for a context, position, and style. Line L503 indicates that a value of the candidate key is "573093486". Lines L504 and L505 indicate (x,y) coordinates of a starting point of the value of L503. Lines L506 and L507 indicate (x,y) coordinates of a starting point of the candidate key. Line L508 indicates that the candidate key has a text "Accnt No".

In processing the input of lines L501 through L509, the semantic normalization engine 160 first looks into the key ontology data for a match, and then normalizes the text "Accnt No" against key name specification by semantic matching and key alias search. Then the semantic normalization engine 160 derives new aliases for the candidate key from the normal form. The semantic normalization engine 160 determines a key class for the candidate key, and determines a confidence score on the key class by examining the context, positioning, and styles as specified in the document metadata.

Lines L512 through L518 are respectively equal to lines L502 through L508 from the input. As noted in line L508, the candidate key has "Accnt No" in line L518. Line L520 indicates that the semantic normalization engine 160 determines that a key class "customerAccountNumber" corresponds to the candidate key "Accnt No" after normalization. Line L519 indicates that the semantic normalization engine 160 determines that the key class "customerAccountNumber" is 82.35% likely to be a key class corresponding to the candidate key "Accnt No", based on the context, relative positioning, and styles represented in the document metadata, text sequencing, semantic matching, and vector space modeling and text classification.

In certain embodiments, the semantic normalization engine 160 determines the key class "customerAccountNumber" for the candidate key "Accnt No", based on objects grouped in "block_16" in which the candidate key appears, as well as relative styling of the candidate key "Accnt No" in comparison with other objects in the same block. The semantic normalization engine 160 compares textual similarity between the candidate key "Accnt No" and all key classes and determine that the key class "customerAccountNumber" is the closest to the candidate key "Accnt No", as well as the level of proximity as a confidence score.

Figure 6:
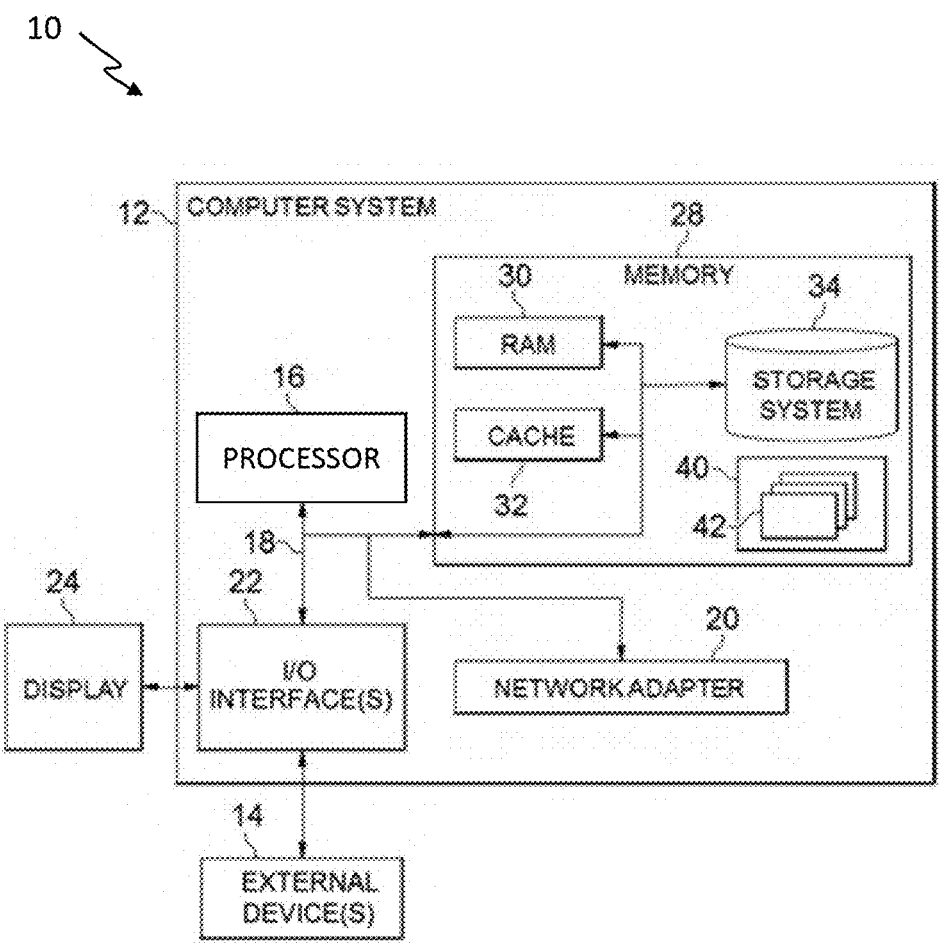
FIG. 6 depicts a cloud computing node according to an embodiment of the present invention.
Figure 7:
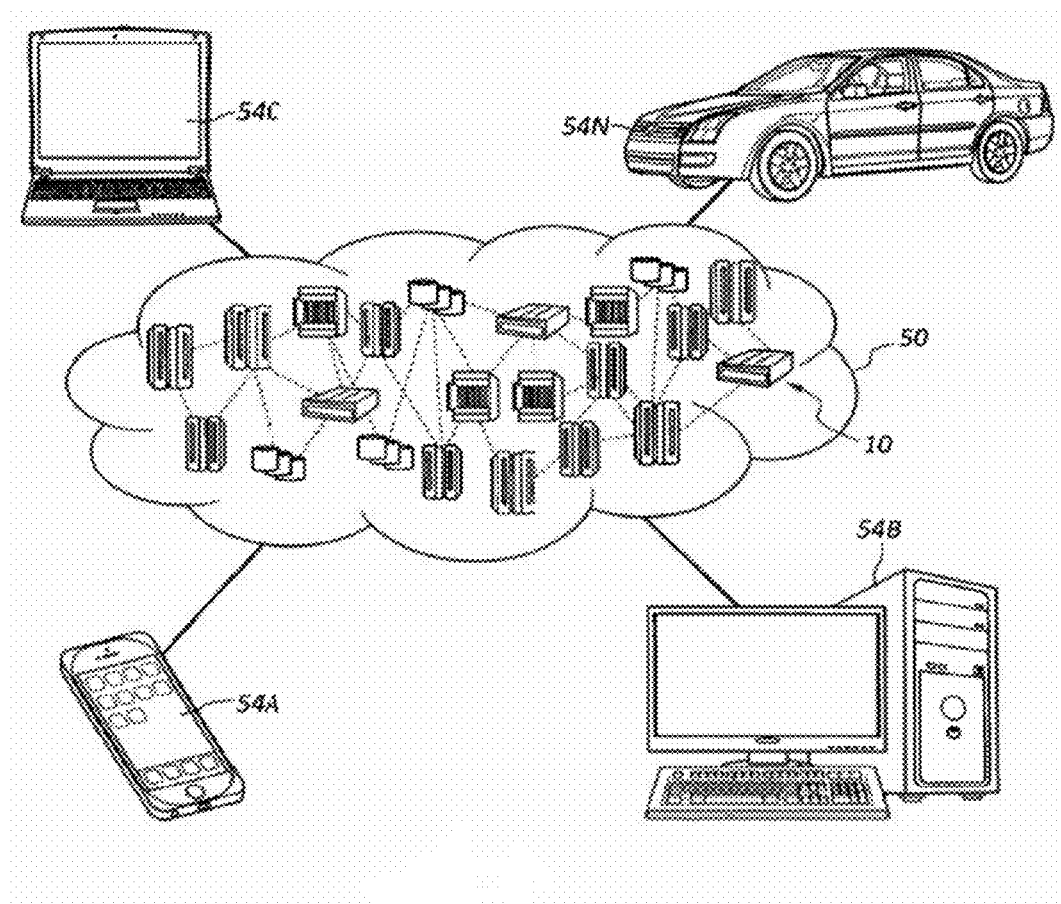
FIG. 7 depicts a cloud computing environment according to an embodiment of the present invention.
Figure 8:
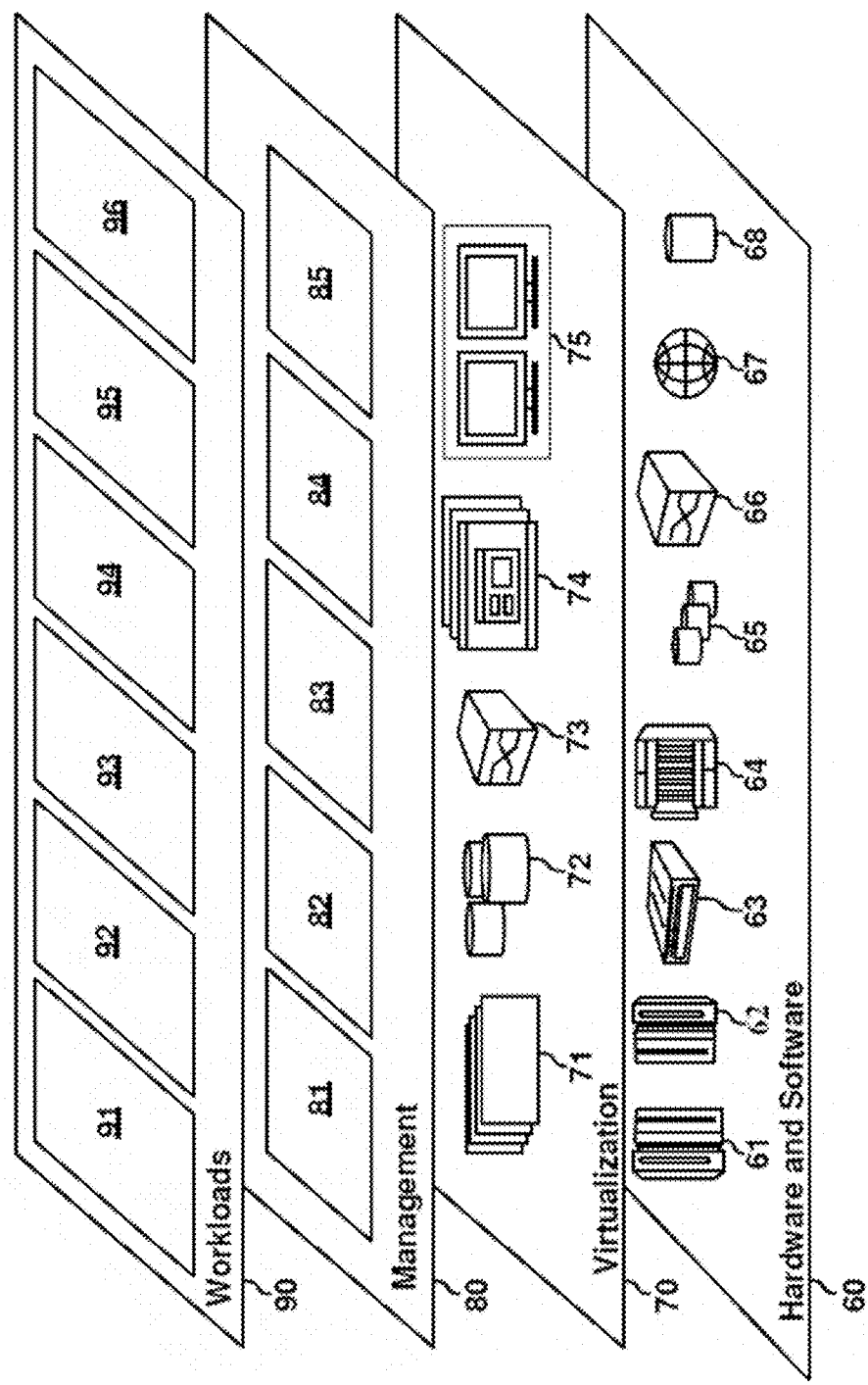
FIG. 8 depicts abstraction model layers according to an embodiment of the present invention.

FIGS. 6-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the document digitization engine 120 and/or the semantic normalization engine 160 of FIG. 1. Program processes 42, as in the document digitization engine 120 and/or the semantic normalization engine 160 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the document digitization services as provided by the document digitization engine including the semantic normalization engine 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for normalizing a key in a document image comprising:
   obtaining, by one or more processor of a computer, document metadata of the document image, wherein the document metadata include a context, a position, and a style respective to each object appearing in the document image;
   identifying a candidate key corresponding to an object in the document image with a key in key ontology data, based on that the candidate key is semantically interchangeable with the key, wherein the candidate key is a string of text characters appearing in the document image at certain position coordinates of the document image;
   normalizing the candidate key into a normal form;
   determining a key class corresponding to the normal form, wherein the key class is associated with the key in the key ontology data;
   assessing a confidence score for the key class, wherein the confidence score indicates a likelihood of the key class being representative of the candidate key, based on the document metadata; and
   updating a semantic database with the key class, based on verifying the key class according to a preconfigured manner of verification, such that the key class may be efficiently associated with a semantically interchangeable text appearing in other document images.

2. The computer implemented method of claim 1, further comprising:
   deriving zero or more alias of the key class;
   comparing the derived alias with aliases in a key alias set corresponding to the key from the semantic database;
   discovering that the derived alias is not present in the key alias set and that respective confidence score corresponding to each of the derived alias is greater than a preconfigured threshold; and
   updating the semantic database with the derived alias.

3. The computer implemented method of claim 1, wherein the key in the key ontology data is equal to the key class.

4. The computer implemented method of claim 1, the assessing comprising:
   comparing a context of the candidate key as specified in the document metadata and a context of the key class, wherein the context of the candidate key indicates other objects appearing together with the candidate key in the document image, and wherein the context of the key class indicates other typical objects appeared together with keys of the key class in past document images; and
   adjusting the confidence score proportional to a level of similarity between the context of the candidate key and the context of the key class.

5. The computer implemented method of claim 1, the assessing comprising:
   comparing a position of the candidate key as specified in the document metadata and a position of the key class, wherein the position of the candidate key indicates relative portion of the document image in which the candidate key appears, and wherein the position of the key class indicates relative portions of past document images in which keys of the key class typically appeared; and
   adjusting the confidence score proportional to a level of similarity between the position of the candidate key and the position of the key class.

6. The computer implemented method of claim 1, the assessing comprising:
   comparing a style of the candidate key as specified in the document metadata and a style of the key class, wherein the style of the candidate key indicates a font type and size of the candidate key in relation to styles of other objects as appearing in the document image, and wherein the style of the key class indicates font types and sizes of keys of the key class in relation to styles of other objects as typically appeared in past document images; and
   adjusting the confidence score proportional to a level of similarity between the style of the candidate key and the style of the key class.

7. The computer implemented method of claim 1, wherein the normal form is an extended Backus-Naur form (EBNF) notation, and wherein the document metadata is expressed in JavaScript Object Notation (JSON) format.

8. The computer implemented method of claim 1, wherein the key specified in the key ontology data is a name of a data field in a relational database, wherein the key is associated with a value as extracted from the document image, and the key and the value forms a key-value pair in the relational database for future computation.

9. A computer implemented method for normalizing a key in a document image comprising:
   identifying, by one or more processor of a computer, a candidate key corresponding to an object in the document image with a key in key ontology data, based on that the candidate key is semantically interchangeable with the key, wherein the candidate key is a string of text characters appearing in the document image at certain position coordinates of the document image;
   normalizing the candidate key into a normal form;
   deriving one or more alias of the candidate key from the normal form, wherein the one or more alias is not associated with the key in a semantic database;
   assessing respective confidence score for each of the one or more alias, wherein the confidence score indicates a likelihood of each alias being representative of the candidate key, based on document metadata of the document image; and
   updating the semantic database with the one or more alias, based on verifying the one or more alias according to a preconfigured manner of verification, such that the one or more alias may be efficiently associated with a text from other document images, based on that the text semantically matches with the candidate key.

10. A computer program product comprising:
a computer readable storage medium readable by one or more processor and storing instructions for execution by the one or more processor for performing a method for normalizing a key in a document image comprising:
obtaining document metadata of the document image, wherein the document metadata include a context, a position, and a style respective to each object appearing in the document image;
identifying a candidate key corresponding to an object in the document image with a key in key ontology data, based on that the candidate key is semantically interchangeable with the key, wherein the candidate key is a string of text characters appearing in the document image at certain position coordinates of the document image;
normalizing the candidate key into a normal form;
determining a key class corresponding to the normal form, wherein the key class is associated with the key in the key ontology data;
assessing a confidence score for the key class, wherein the confidence score indicates a likelihood of the key class being representative of the candidate key, based on the document metadata; and
updating a semantic database with the key class, based on verifying the key class according to a preconfigured manner of verification, such that the key class may be efficiently associated with a semantically interchangeable text appearing in other document images.

11. The computer program product of claim 10, further comprising:
deriving zero or more alias of the key class;
comparing the derived alias with aliases in a key alias set corresponding to the key from the semantic database;
discovering that the derived alias is not present in the key alias set and that respective confidence score corresponding to each of the derived alias is greater than a preconfigured threshold; and
updating the semantic database with the derived alias.

12. The computer program product of claim 10, wherein the key in the key ontology data is equal to the key class.

13. The computer program product of claim 10, the assessing comprising:
comparing a context of the candidate key as specified in the document metadata and a context of the key class, wherein the context of the candidate key indicates other objects appearing together with the candidate key in the document image, and wherein the context of the key class indicates other typical objects appeared together with keys of the key class in past document images; and
adjusting the confidence score proportional to a level of similarity between the context of the candidate key and the context of the key class.

14. The computer program product of claim 10, the assessing comprising:
comparing a position of the candidate key as specified in the document metadata and a position of the key class, wherein the position of the candidate key indicates relative portion of the document image in which the candidate key appears, and wherein the position of the key class indicates relative portions of past document images in which keys of the key class typically appeared; and
adjusting the confidence score proportional to a level of similarity between the position of the candidate key and the position of the key class.

15. The computer program product of claim 10, the assessing comprising:
comparing a style of the candidate key as specified in the document metadata and a style of the key class, wherein the style of the candidate key indicates a font type and size of the candidate key in relation to styles of other objects as appearing in the document image, and wherein the style of the key class indicates font types and sizes of keys of the key class in relation to styles of other objects as typically appeared in past document images; and
adjusting the confidence score proportional to a level of similarity between the style of the candidate key and the style of the key class.

16. The computer program product of claim 10, wherein the normal form is an extended Backus-Naur form (EBNF) notation, and wherein the document metadata is expressed in JavaScript Object Notation (JSON) format.

17. The computer program product of claim 10, wherein the key specified in the key ontology data is a name of a data field in a relational database, wherein the key is associated with a value as extracted from the document image, and the key and the value forms a key-value pair in the relational database for future computation.

18. A computer program product comprising:
a computer readable storage medium readable by one or more processor and storing instructions for execution by the one or more processor for performing a method for normalizing a key in a document image comprising:
identifying a candidate key corresponding to an object in the document image with a key in key ontology data, based on that the candidate key is semantically interchangeable with the key, wherein the candidate key is a string of text characters appearing in the document image at certain position coordinates of the document image;
normalizing the candidate key into a normal form;
deriving one or more alias of the candidate key from the normal form, wherein the one or more alias is not associated with the key in a semantic database;
assessing respective confidence score for each of the one or more alias, wherein the confidence score indicates a likelihood of each alias being representative of the candidate key, based on document metadata of the document image; and
updating the semantic database with the one or more alias, based on verifying the one or more alias according to a preconfigured manner of verification, such that the one or more alias may be efficiently associated with a text from other document images, based on that the text semantically matches with the candidate key.

19. A system comprising:
a memory;
one or more processor in communication with the memory; and
program instructions executable by the one or more processor via the memory to perform a method for normalizing a key in a document image comprising:
obtaining document metadata of the document image, wherein the document metadata include a context, a position, and a style respective to each object appearing in the document image;
identifying a candidate key corresponding to an object in the document image with a key in key ontology data, based on that the candidate key is semantically interchangeable with the key, wherein the candidate key is a string of text characters appearing in the document image at certain position coordinates of the document image;

normalizing the candidate key into a normal form;

determining a key class corresponding to the normal form, wherein the key class is associated with the key in the key ontology data;

assessing a confidence score for the key class, wherein the confidence score indicates a likelihood of the key class being representative of the candidate key, based on the document metadata; and updating a semantic database with the key class, based on verifying the key class according to a preconfigured manner of verification, such that the key class may be efficiently associated with a semantically interchangeable text appearing in other document images.

20. The computer implemented method of claim 1, further comprising:

deriving zero or more alias of the key class;

comparing the derived alias with aliases in a key alias set corresponding to the key from the semantic database;

discovering that the derived alias is not present in the key alias set and that respective confidence score corresponding to each of the derived alias is greater than a preconfigured threshold; and updating the semantic database with the derived alias.

21. The computer implemented method of claim 1, wherein the candidate key is a string of text characters defining a key value pair (KVP) key.

22. The computer implemented method of claim 1, wherein the candidate key is a string of text characters defining a key value pair (KVP) key, wherein the position of the metadata specifies the certain position coordinates of the document image in which the string of text characters appears in the document image, wherein the assessing the confidence score for the key class includes comparing the position coordinates of the candidate key as specified in the document metadata and a position of the key class, wherein the position coordinates of the candidate key indicates relative portion of the document image in which the candidate key appears, and wherein the position of the key class indicates relative portions of past document images in which keys of the key class typically appeared; and adjusting the confidence score proportional to a level of similarity between the position coordinates of the candidate key and the position of the key class.

23. The computer implemented method of claim 1, wherein the candidate key is a string of text characters defining a key value pair (KVP) key, wherein the position of the metadata specifies the certain position coordinates of the document image in which the string of text characters appears in the document image, wherein the assessing the confidence score for the key class includes comparing the position coordinates of the candidate key as specified in the document metadata and a position of the key class, wherein the position coordinates of the candidate key indicates relative portion of the document image in which the candidate key appears, and wherein the position of the key class indicates relative portions of past document images in which keys of the key class typically appeared; and adjusting the confidence score proportional to a level of similarity between the position coordinates of the candidate key and the position of the key class, wherein the assessing the confidence score for the key class includes comparing a context of the candidate key as specified in the document metadata and a context of the key class, wherein the context of the candidate key indicates other objects appearing together with the candidate key in the document image, and wherein the context of the key class indicates other typical objects appeared together with keys of the key class in past document images; and adjusting the confidence score proportional to a level of similarity between the context of the candidate key and the context of the key class, wherein the assessing the confidence score for the key class includes comparing a style of the candidate key as specified in the document metadata and a style of the key class, wherein the style of the candidate key indicates a font type and size of the candidate key in relation to styles of other objects as appearing in the document image, and wherein the style of the key class indicates font types and sizes of keys of the key class in relation to styles of other objects as typically appeared in past document images; and adjusting the confidence score proportional to a level of similarity between the style of the candidate key and the style of the key class.

24. The computer implemented method of claim 9, wherein the candidate key is a string of text characters defining a key value pair (KVP) key.

25. The computer program product of claim 10, wherein the candidate key is a string of text characters defining a key value pair (KVP) key.

\* \* \* \* \*